US009088753B2

United States Patent
Akiba et al.

(10) Patent No.: US 9,088,753 B2
(45) Date of Patent: Jul. 21, 2015

(54) IMAGE FORMING APPARATUS, LUMINANCE CORRECTION METHOD, AND STORAGE MEDIUM STORING PROGRAM

(71) Applicant: CANON KABUSHIKI KAISHA, Tokyo (JP)

(72) Inventors: Hiromitsu Akiba, Yokohama (JP); Tetsuya Suwa, Yokohama (JP); Nobutaka Miyake, Yokohama (JP); Ryosuke Iguchi, Kawasaki (JP); Yusuke Hashii, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/148,903

(22) Filed: Jan. 7, 2014

(65) Prior Publication Data
US 2014/0198354 A1   Jul. 17, 2014

(30) Foreign Application Priority Data

Jan. 11, 2013   (JP) .................................. 2013-004050

(51) Int. Cl.
*H04N 1/407* (2006.01)
*H04N 1/60* (2006.01)

(52) U.S. Cl.
CPC ........... *H04N 1/6027* (2013.01); *H04N 1/4074* (2013.01)

(58) Field of Classification Search
None
See application file for complete search history.

(56) References Cited

U.S. PATENT DOCUMENTS

| 6,009,213 | A  | 12/1999 | Miyake |
| 6,608,926 | B1 | 8/2003  | Suwa et al. |
| 6,694,051 | B1 | 2/2004  | Yamazoe et al. |
| 6,813,386 | B2 | 11/2004 | Noguchi et al. |
| 7,006,668 | B2 | 2/2006  | Iguchi et al. |
| 7,103,214 | B2 | 9/2006  | Kusakabe et al. |
| 7,167,205 | B2 | 1/2007  | Akiyama et al. |
| 7,177,463 | B2 | 2/2007  | Kusakabe et al. |
| 7,432,985 | B2 | 10/2008 | Ishikawa et al. |
| 7,433,538 | B2 | 10/2008 | Kusakabe et al. |
| 7,634,153 | B2 | 12/2009 | Miyake et al. |

(Continued)

FOREIGN PATENT DOCUMENTS

| JP | 09-167227 A   | 6/1997 |
| JP | 2001-197308 A | 7/2001 |

OTHER PUBLICATIONS

Machine translation of JP-H09-167227, published Jun. 1997 by Kurosu.*

*Primary Examiner* — Paul F Payer
(74) *Attorney, Agent, or Firm* — Fitzpatrick, Cella, Harper & Scinto

(57) ABSTRACT

An image processing apparatus includes an image data acquisition unit to acquire image data by optically reading a document. A frequency distribution acquisition unit acquires a first frequency distribution of luminances from the image data acquired by the image data acquisition unit. A generation unit generates a second frequency distribution of luminances of a background of the document, by using a maximum frequency of the first frequency distribution as a maximum frequency of the second frequency distribution of luminances of the background of the document. An acquisition unit acquires information indicating a degree of deviation of the second frequency distribution from the first frequency distribution. A correction unit corrects the second frequency distribution based on the information indicating the degree of deviation acquired by the acquisition unit.

24 Claims, 7 Drawing Sheets

(56) References Cited

U.S. PATENT DOCUMENTS

| | | |
|---|---|---|
| 7,738,030 B2 | 6/2010 | Akiyama et al. |
| 7,924,469 B2 | 4/2011 | Ono et al. |
| 7,944,588 B2 | 5/2011 | Yamada et al. |
| 8,023,764 B2 | 9/2011 | Miyake et al. |
| 8,175,155 B2 | 5/2012 | Suwa et al. |
| 8,237,991 B2 | 8/2012 | Ono et al. |
| 8,306,357 B2 | 11/2012 | Miyake et al. |
| 8,600,154 B2 | 12/2013 | Umeda et al. |
| 8,675,249 B2 | 3/2014 | Umeda et al. |
| 2001/0007596 A1 | 7/2001 | Noguchi et al. |
| 2013/0028537 A1 | 1/2013 | Miyake et al. |
| 2014/0010415 A1 | 1/2014 | Kunieda et al. |
| 2014/0010442 A1 | 1/2014 | Kato et al. |
| 2014/0010450 A1 | 1/2014 | Suwa et al. |
| 2014/0010451 A1 | 1/2014 | Sumi et al. |
| 2014/0013213 A1 | 1/2014 | Kajiwara et al. |
| 2014/0037208 A1 | 2/2014 | Umeda et al. |
| 2014/0044354 A1 | 2/2014 | Umeda et al. |

\* cited by examiner

IMAGE FORMING APPARATUS, LUMINANCE CORRECTION METHOD, AND STORAGE MEDIUM STORING PROGRAM

BACKGROUND OF THE INVENTION

1. Field of the Invention

The present invention relates to an image processing apparatus that detects luminance values of a background by analyzing a luminance histogram of an image, to a luminance correction method, and to a storage medium storing a program.

2. Description of the Related Art

A reading apparatus called a scanner is known that optically reads documents such as document originals and images such as photographs, and converts the read documents and images into electronic data. In general, when a document original has been read by the reading apparatus, a background does not have the maximum luminance (255 in the case of a color image of RGB channels each having 8 bits), thereby causing various problems. For example, if the read image is displayed on a display apparatus, a dynamic range of the image will decrease. Also, if the read image is printed by a printing apparatus such as a printer, the running cost will increase as coloring material is ejected for the background as well. Furthermore, if the read image is stored in a compressed state in a storage apparatus such as a hard disk drive, the compression ratio will be reduced as the background has signal values, thereby lowering the efficiency of memory use.

For the aforementioned reasons, background removal processing for removing the color of the background is generally applied to the read image. For example, as the background removal processing, a method is known for estimating the luminance values of the background from the result of analyzing the image, and converting luminance values that are equal to or larger than the estimated luminance values into the maximum luminance; in this method, it is important to appropriately estimate the luminance values of the background.

In Japanese Patent Laid-Open No. 09-167227, a luminance histogram of an image including a subject and a background is obtained. Then, the frequency corresponding to the maximum luminance value out of the frequencies representing local peaks is determined as an axis, the shape of a histogram defined by the axis and the substantially maximum luminance value is flipped toward the lower luminance side over the axis, and the resultant histogram is used as a histogram corresponding only to the background (the luminance distribution of the background). Japanese Patent Laid-Open No. 09-167227 takes advantage of the fact that the histogram corresponding only to the background shows distribution that is bilaterally symmetrical with respect to the luminance value corresponding to the peak frequency.

In Japanese Patent Laid-Open No. 2001-197308, a density tone histogram is generated for an image including a background, characters, and the like. Then, a peak tone value corresponding to a peak frequency is calculated, a first tone value corresponding to a predetermined frequency threshold on the lower tone side of the peak tone value is obtained, and a reference threshold (the end point of distribution corresponding to the background) is calculated by adding, to the peak tone value, a value of a difference between the peak tone value and the first tone value. Japanese Patent Laid-Open No. 2001-197308 also takes advantage of the fact that the histogram obtained from an image including only the background shows distribution that is bilaterally symmetrical with respect to the peak tone value. The luminance distribution of the background can be obtained by utilizing the aforementioned nature of the histogram of the background that shows bilaterally symmetrical distribution.

Although the luminance distribution of the background is bilaterally symmetrical with respect to the axis, i.e. the peak value, the luminance distribution of areas other than the background, which are formed by coloring material ejected onto the background, is not always bilaterally symmetrical with respect to the axis, i.e. the peak value depending on the amount of the coloring material and the way the coloring material is ejected. FIG. 10 shows the luminance distribution of a background, the luminance distributions of various light colors, and the composite distribution thereof. As shown in FIG. 10, in the case where the luminance distributions of various light colors exist in the vicinity of the lower luminance side of the luminance distribution of the background, the peak value A' of the composite distribution thereof shifts toward the lower luminance side of the peak value A of the luminance distribution of the background. This is because the background, which has the maximum luminance in the image and a large area (high frequency), is influenced by the luminance distributions of light colors overlapping in the vicinity of the lower luminance side of the luminance distribution of the background.

Neither Japanese Patent Laid-Open No. 09-167227 nor Japanese Patent Laid-Open No. 2001-197308 takes into consideration the fact that, in the case where the luminance distributions of light colors are composited with the luminance distribution of the background in the vicinity of the lower luminance side of the luminance distribution of the background, the peak value of the composite distribution actually shifts toward the lower luminance side. For this reason, if the shape of the histogram of the composite distribution on the higher luminance side is flipped over the axis passing through the peak of the composite distribution, the edge of the resultant symmetry line on the lower luminance side has lower luminance than the edge B of the actual luminance distribution of the background. If the background removal processing is executed based on the detected edge of the luminance distribution of the background, light colors are unnecessarily removed. As light colors, in some cases, serve as information that has been intentionally added by a creator of a document original for distinction from the background, unnecessary removal of light colors leads to loss of such information.

SUMMARY OF THE INVENTION

An aspect of the present invention is to eliminate the above-mentioned problems with the conventional technology. The present invention provides an image forming apparatus that improves the accuracy of detection of a luminance range of a background, a luminance correction method, and a storage medium storing a program.

The present invention in its one aspect provides an image forming apparatus comprising: an image data acquisition unit configured to acquire image data by optically reading a document; a frequency distribution acquisition unit configured to acquire a frequency distribution of luminances from the image data acquired by the image data acquisition unit; a generation unit configured to generate a frequency distribution corresponding to a frequency distribution of luminances of a background of the document, by using a maximum frequency of the frequency distribution acquired by the frequency distribution acquisition unit as a maximum frequency of the frequency distribution of the luminances of the background of the document; a difference acquisition unit configured to acquire a difference between the frequency distribution of the luminances of the background of the document generated by the generation unit and the frequency distribution of the luminances acquired by the frequency distribution acquisition unit; and a correction unit configured to correct the frequency distribution of the luminances of the background of the document based on the difference acquired by the difference acquisition unit.

The present invention can improve the accuracy of detection of a luminance range of a background.

Further features of the present invention will become apparent from the following description of exemplary embodiments with reference to the attached drawings.

DESCRIPTION OF THE EMBODIMENTS

Figure 1A:
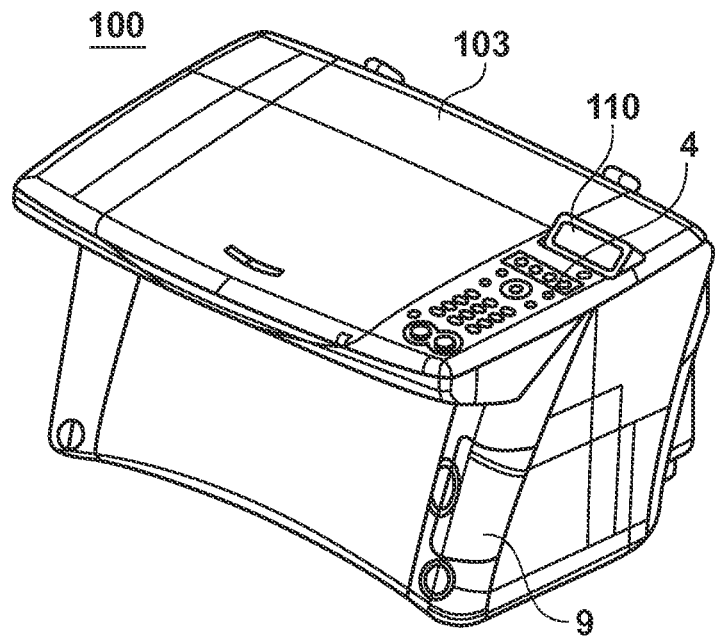
FIGS. 1A and 1B are external perspective views showing an image forming apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that like constituent elements will be denoted by like reference signs, and redundant descriptions thereof will not be given.

First Embodiment

Configuration of Image Forming Apparatus

FIG. 1 is an external perspective view showing an image forming apparatus according to an embodiment of the present invention. In the present embodiment, a multifunctional printer (MFP) is used as one example of the image forming apparatus. An MFP is an apparatus integrating a print function for printing an image on a printing medium by, for example, ejecting drops of ink, a scan function for optically reading a document placed on a platen, a facsimile function, and the like. By using the print function, the MFP 100 shown in FIG. 1 can print an image on a printing medium, such as a paper, based on image data received from a host computer, not shown in the drawings, connected thereto. The MFP 100 can also print an image based on image data stored in a memory card and the like, and print an image by optically reading a document (copy function).

Figure 1B:
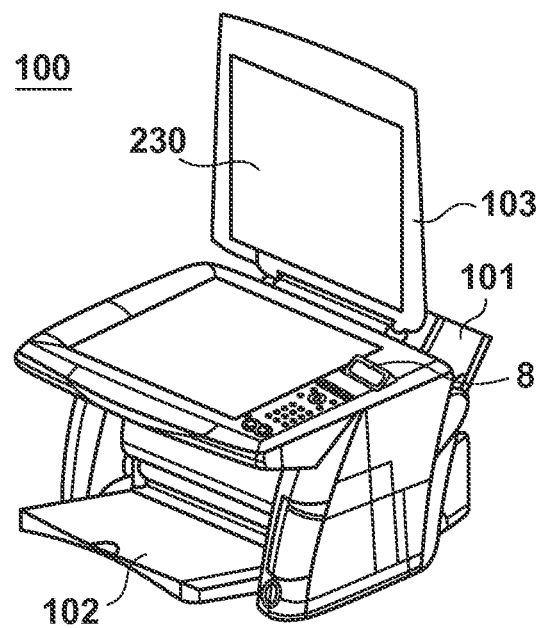

FIG. 1A shows the state where a document cover 103 is closed, and FIG. 1B shows the state where a tray 101 on which a printing medium is placed, a discharge tray 102, and the document cover 103 are open. A reading unit 8, which includes a contact image sensor (CIS) unit, optically reads a document and outputs an analog electrical signal corresponding to the colors red (R), green (G), and blue (B). For example, a memory card having recorded therein image data captured by a digital still camera, not shown in the drawings, is inserted into a card interface 9. The image data can be read from the memory card in accordance with a user operation on an operation unit 4. Furthermore, an LCD 110, which is a display, is arranged in the vicinity of the operation unit 4 on the MFP 100. The LCD 110 displays the contents of settings made via the operation unit 4 and a menu for selecting the functions.

Figure 2:
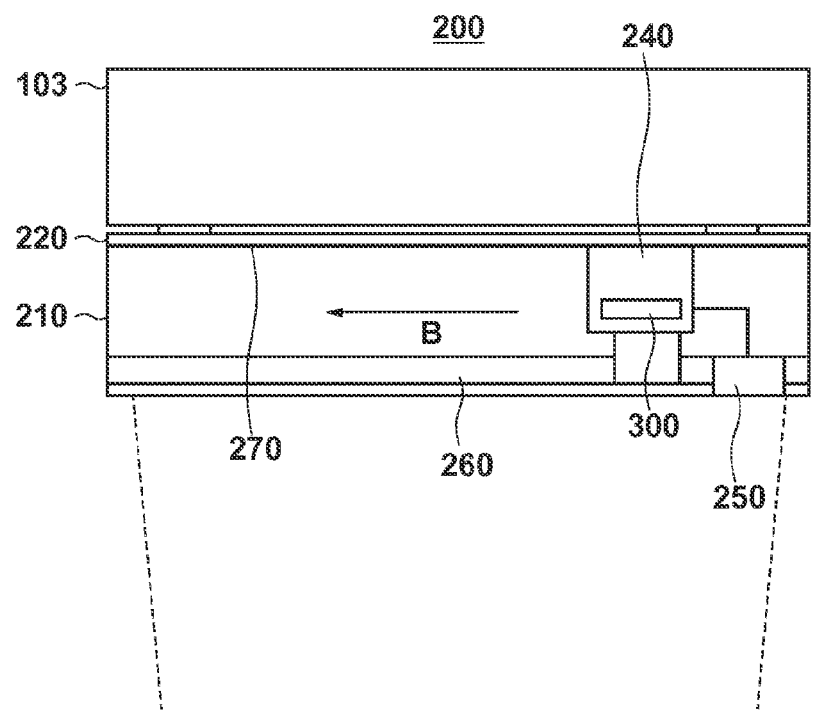
FIG. 2 is a cross-sectional view showing an image reading unit arranged in the upper part of an MFP.

FIG. 2 is a cross-sectional view showing an image reading unit 200 arranged in the upper part of the MFP 100 shown in FIG. 1. As shown in FIG. 2, the image reading unit 200 is composed of a main body 210 and a pressure board 230 that presses a document 220 to be read and blocks external light. Although not shown in FIG. 2, the pressure board 230 is arranged on the back surface of the document cover 103. The main body 210 is provided with an optical unit 240, a circuit board 250 electrically connected to the optical unit 240, a sliding rod 260 that serves as a guide rail when the optical unit 240 performs scanning, and the glass platen 270. The optical unit 240 is equipped with a contact image sensor (CIS) unit 300 that irradiates the document 220 with light, receives reflected light, and converts the reflected light into an electrical signal. In image reading processing, the optical unit 240 scans the document 220 placed on the glass platen 270 in the direction of arrow B (sub-scanning direction); as a result, an image printed on the document 220 is optically read, and image data is acquired.

Figure 3:
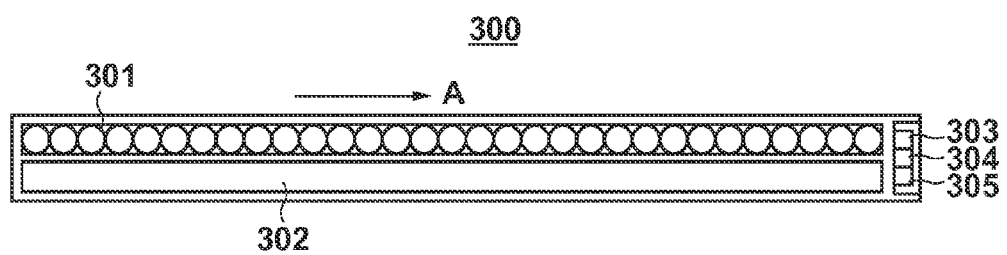
FIG. 3 is a cross-sectional side view showing a configuration of a CIS unit.

FIG. 3 is a cross-sectional side view showing a configuration of the contact image sensor (CIS) unit 300. As shown in FIG. 3, the CIS unit 300 includes a red LED 303 that emits red (R) light, a green LED 304 that emits green (G) light, and a blue LED 305 that emits blue (B) light. In original reading processing, the CIS unit 300 time-divisionally causes the LEDs of different colors to emit light for each reading line. Then, the document is uniformly irradiated with the emitted light via a light guide 302, and reflected light is converted into an electrical signal by collecting the reflected light using a SELFOC (registered trademark) lens 301 on a per-pixel basis and then focusing the collected light on a photoelectric conversion element, not shown in the drawings. In this way, an image signal corresponding to one reading line composed of color signals of three color components, i.e. RGB color components, is output. The image reading processing is executed for the entire document by the CIS unit 300 moving in the sub-scanning direction B. The direction of arrow A, in which cells of the SELFOC (registered trademark) lens 301 are arrayed, is a main scanning direction. The main scanning direction and the sub-scanning direction are perpendicular to each other. In FIG. 3, the sub-scanning direction B is perpendicular to the drawing plane.

Figure 4:
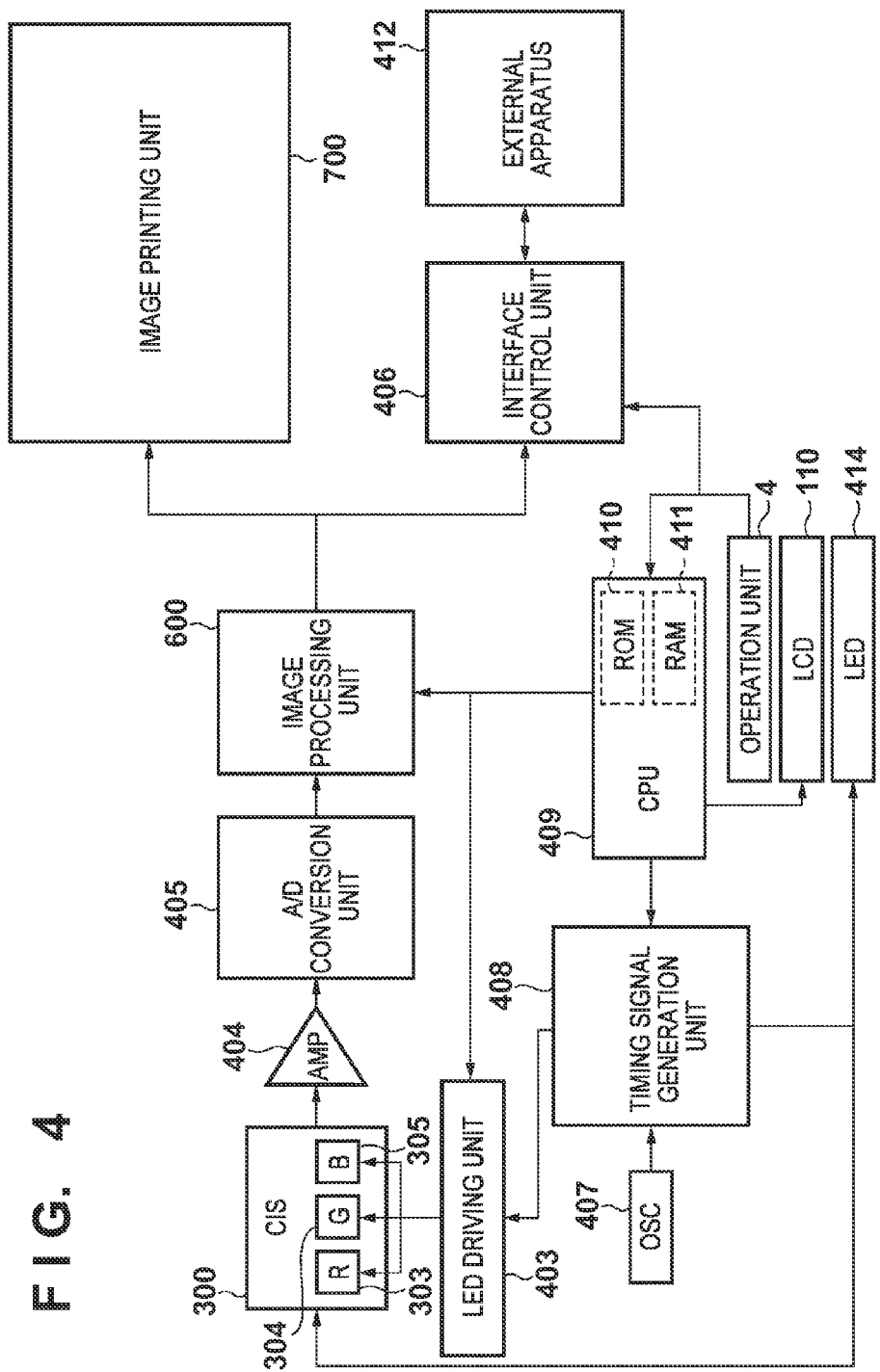
FIG. 4 is a block diagram showing a configuration of a control system of the image reading unit.

FIG. 4 is a block diagram showing a configuration of a control system of the image reading unit 200. The CIS unit 300 can read a color image by an LED driving unit 403 causing the LEDs 303 to 305, which are light sources of different colors, to emit light in order for each reading line. The LED driving unit 403 can change the amount of light from the LEDs 303 to 305 with which the document is irradiated. The LED driving unit 403 can also cause the LEDs 303 to 305 to emit light arbitrarily. For example, the LED driving unit 403 can cause the LEDs 303 to 305 to either emit light of one channel or two channels at a time in order, or emit light of all three channels. A CPU 409 controls the LED driving unit 403 by reading and executing a control program 670 stored in a ROM 410.

An amplifier (AMP) 404 amplifies an analog electrical signal output from the CIS unit 300. An A/D conversion unit 405 applies A/D conversion to the amplified analog electrical signal and outputs, for example, digital image data in which each pixel has 16-bit component for each color (hereinafter referred to as image data). An image processing unit 600 applies various types of image processing to the digital image data converted by the A/D conversion unit 405. An interface control unit 406 reads image data from the image processing unit 600 and transmits the read image data to an external apparatus 412 together with control data. Alternatively, the interface control unit 406 outputs image data from the image processing unit and image data from the external apparatus 412 to an image printing unit 700 together with control data. The external apparatus 412 is, for example, a general-purpose personal computer. The image printing unit 700 converts image data into binary data indicating "print" or "not print" on a per-pixel basis, and prints the image data on a printing medium by, for example, ejecting ink from a printing head. For example, an inkjet printer, a laser beam printer using an electrophotography method, or a sublimation printer is used as the image printing unit 700.

The operations for executing the functions of the MFP 100 are classified roughly into two types. One type is associated with the case where the MFP 100 executes its functions based on a user operation on the operation unit 4, and the other type is associated with the case where the MFP 100 executes its functions based on an instruction from the external apparatus 412.

Figure 5:
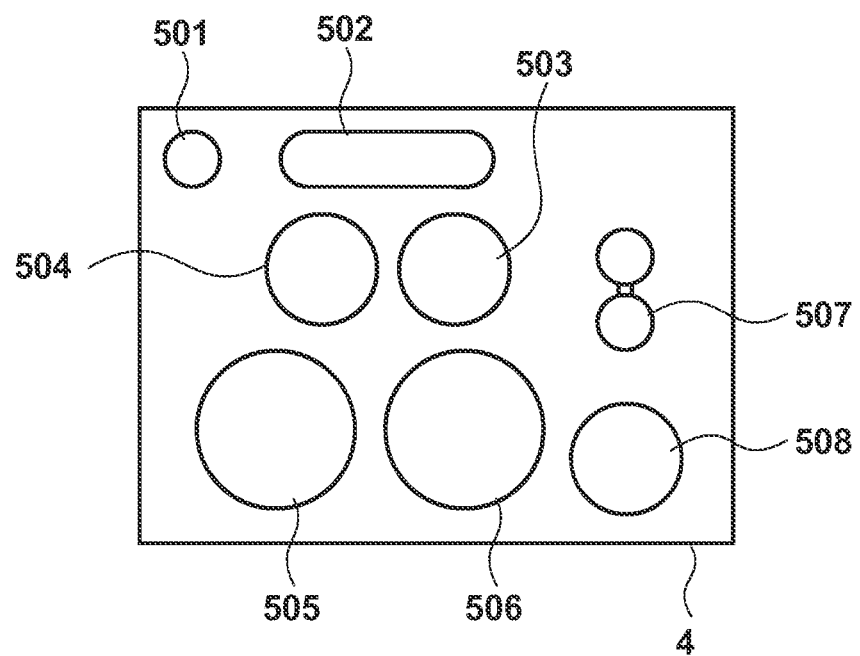
FIG. 5 shows a configuration of an operation unit.

FIG. 5 shows a configuration of the operation unit 4. The CPU 409 can recognize a user operation when an output signal from the operation unit 4 corresponding to the user operation is input to an input port of the CPU 409. Referring to FIG. 5, a button 501 is a power key, and a button 502 is a function selection button. Function contents are displayed on the LCD 110 in accordance with the number of times the button 502 has been pressed. If the user performs operations with respect to the displayed function contents and then presses a determination button 503, the resultant function settings are stored in a RAM 411. A button 504 is a cancel button used to cancel the user operations. A button 505 is used to start a color copy operation in accordance with the settings stored in the RAM 411. A button 506 is used to start a monochrome copy operation in accordance with the settings stored in the RAM 411. Buttons 507 are used to designate the number of sheets, density, and the like. A button 508 is a reset button used to cancel the scanning and printing.

The description will be continued below with reference to FIG. 4. An operation instruction from the operation unit 4 is processed by the CPU 409. The CPU 409 reads the later-described control program 670 stored in the ROM 410, and executes the control program 670 using the RAM 411 as a working area. An OSC 407 is a reference signal oscillator (OSC) such as a crystal oscillator. A timing signal generation unit 408 applies frequency division to the output from the OSC 407 in accordance with control by the CPU 409, and generates various types of timing signals for controlling the driving timings for LEDs of different colors.

In the case where the MFP 100 operates based on an instruction from the external apparatus 412, the CPU 409 first receives a copy instruction, a scan instruction, etc. from the external apparatus 412 in the form of a job and the like.

Thereafter, in a manner similar to the above description, the CPU 409 reads the control program 670 stored in the ROM 410, and executes the control program 670 using the RAM 411 as a working area. An LED 414 shown in FIG. 4 serves as a backlight source for the LCD 110, and is controlled to emit light by a timing signal (light emission signal) output from the timing signal generation unit 408.

Figure 6:
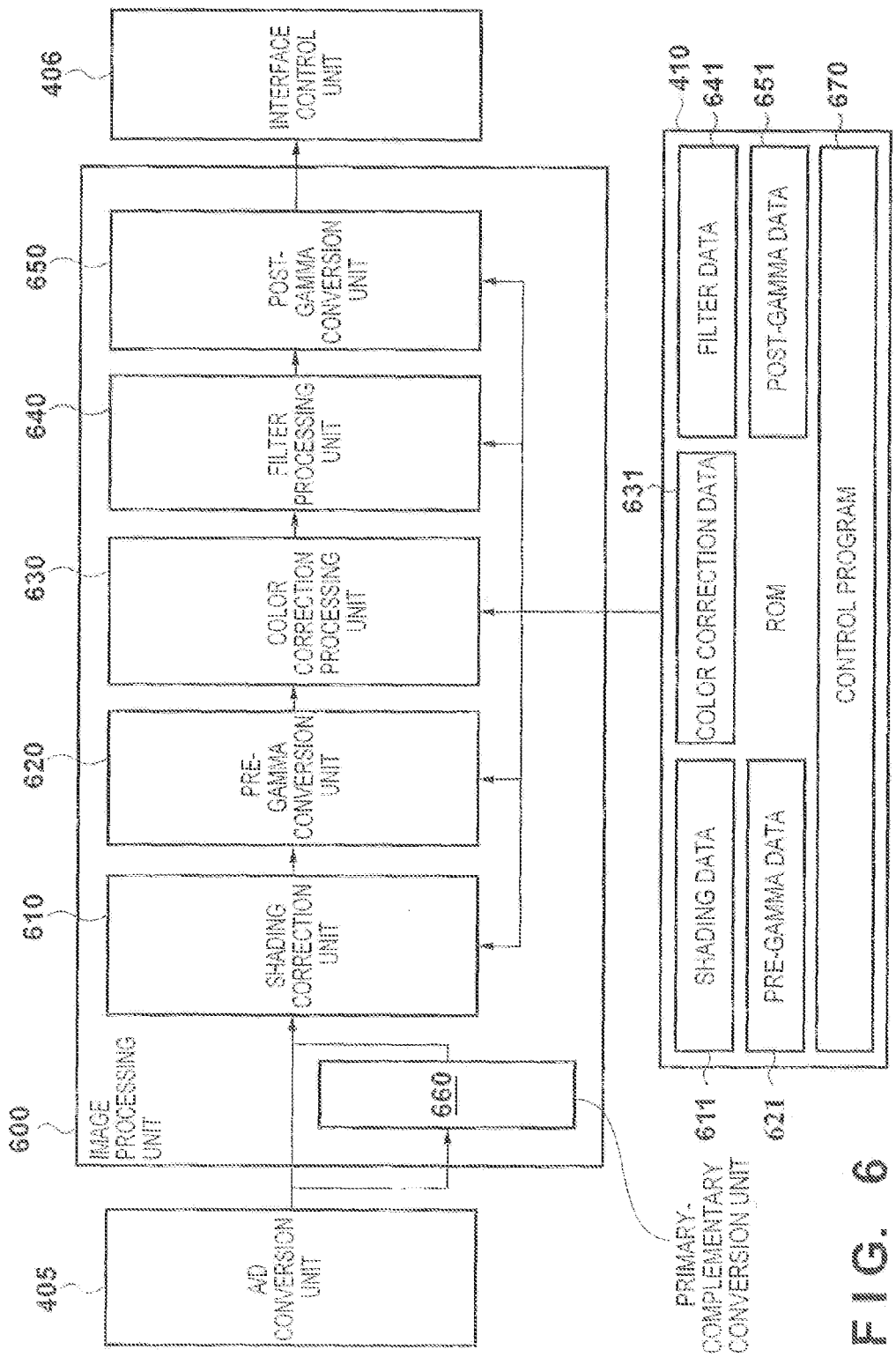
FIG. 6 shows a configuration of an image processing unit.

Specifics of the image processing unit 600 will now be described. FIG. 6 shows a specific configuration of the image processing unit 600. First, digital image data converted by the A/D conversion unit 405 is input to a shading correction unit 610. The shading correction unit 610 performs shading correction by reading a standard white board (not shown in the drawings) that is provided on the back surface of an index board (not shown in the drawings) attached to the glass platen 270 of the image reading unit 200. Shading data 611 stored in the ROM 410 is used in the shading correction. The digital image data to which the shading correction has been applied is input to a pre-gamma conversion unit 620. The pre-gamma conversion unit 620 applies gamma correction to the input digital image data so as to achieve a visually appropriate luminance distribution. Pre-gamma data 621 stored in the ROM 410 is used by the pre-gamma conversion unit 620.

The digital image data to which the pre-gamma conversion has been applied is input to a color correction processing unit 630. The color correction processing unit 630 applies color correction processing to the input digital image data so as to achieve appropriate colors. In the present embodiment, background removal processing is executed as a part of the color correction processing. Color correction data 631 stored in the ROM 410 is used by the color correction processing unit 630. The digital image data to which the color correction processing has been applied is input to a filter processing unit 640. The filter processing unit 640 applies filter processing, such as edge enhancement and noise reduction, to the digital image data. Filter data 641 stored in the ROM 410 is used in the filter processing.

The digital image data to which the filter processing has been applied is input to a post-gamma conversion unit 650. The post-gamma conversion unit 650 finely adjusts the luminance characteristics of the input digital image data again in accordance with the intended use. Post-gamma data 651 stored in the ROM 410 is used by the post-gamma conversion unit 650. The digital image data to which post-gamma conversion processing has been applied is output to the interface control unit 406.

The CPU 409 supplies the shading data 611, the pre-gamma data 612, the color correction data 631, the filter data 641, and the post-gamma data 651 from the ROM 410 to the shading correction unit 610 to the post-gamma conversion unit 650 in accordance with corresponding processing. In the case where an instruction for reading a complementary color has been issued, a primary-complementary conversion unit 660 shown in FIG. 6 converts digital image data that has been input from the A/D conversion unit 405 and represents a primary color into digital image data representing a complementary color.

Figure 7:
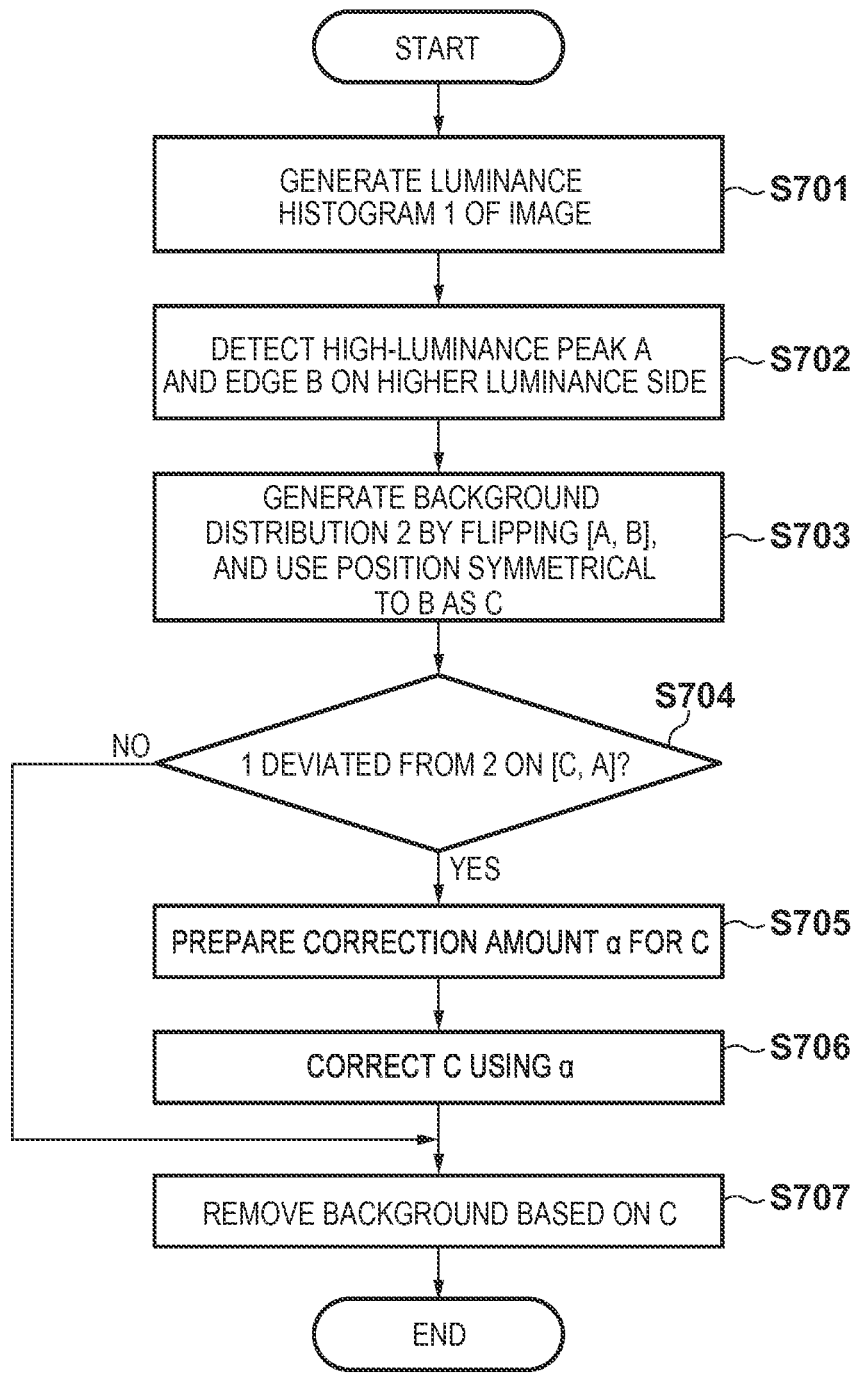
FIG. 7 is a flowchart showing a procedure for background removal processing.

FIG. 7 is a flowchart showing a procedure for background removal processing executed by the color correction processing unit 630. The processing shown in FIG. 7 is executed, for example, by the CPU 409 processing the components of the MFP 100. First, in step S701, a luminance histogram of an image represented by digital image data input from the A/D conversion unit 405 is generated. For example, in generating this luminance histogram, RGB values of pixels in the digital image data are first converted into luminance values in accordance with Expression 1 presenting a commonly-known luminance-RGB conversion.

$$\text{Luminance value} = R \times 0.3 + G \times 0.6 + B \times 0.1 \quad \text{Expression 1}$$

Then, a luminance histogram showing the correspondence between the luminance and the frequency is generated, and a distribution line (frequency distribution) that smoothly represents changes in the frequency is further obtained via a moving average and the like. This distribution line is indicated by a bold line in FIG. 8.

In step S702, peak point A is identified from the distribution line obtained in step S701, peak point A being on an upward convex curve closest to the maximum luminance and corresponding to the maximum frequency. That is to say, in the case the frequency distribution shows a plurality of upward convex curves, peak point A of a curve closest to the maximum luminance is identified. It should be noted that peak point A is a luminance point whose frequency is higher than the frequencies of neighboring luminance points on both sides.

Next, point B is identified from the aforementioned curve, point B being on the higher luminance side of peak point A and having a frequency larger than a preset frequency value. It should be noted that the preset frequency value refers to the lower limit of frequency values that are not considered as noise. Furthermore, point B, which is on the higher luminance side of peak point A, is also identified as a substantial maximum luminance point. In the case where noise and the like need not be taken into consideration, the maximum luminance point on the higher luminance side of peak point A may be directly identified as point B.

Figure 8:
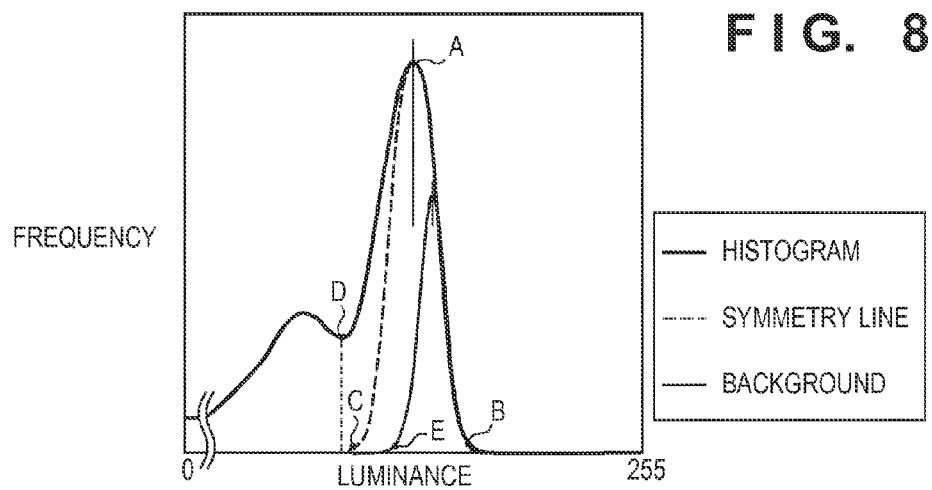
FIG. 8 shows a distribution line obtained from a luminance histogram.

In step S703, a symmetrical distribution is generated by flipping a distribution line from point A to point B toward the lower luminance side over a central axis that is parallel to the axis representing frequency and passes through peak point A, and point C located at a position symmetrical to point B is obtained. The obtained point C is the minimum luminance point in the generated distribution. In FIG. 8, a dashed line from peak point A indicates a symmetry line corresponding to the distribution line from point A to point B. In the present embodiment, the luminance distribution of a background is generated first in step S703, and then the generated luminance distribution of the background is corrected in accordance with a degree of deviation calculated in step S704.

Subsequently, in step S704, a difference between the symmetry line 1 from point C to point A obtained in step S703 and the distribution line 2 from point D to point A is evaluated as a level of deviation (hereinafter referred to as a degree of deviation). In other words, a degree of deviation (%) of a line connecting point C, point A and point B from the distribution line is evaluated. The degree of deviation is calculated using the following Expression 2.

$$\text{Degree of deviation} = \sum_{i=1}^{n} (|X_i - Y_i|) / \sum_{i=1}^{n} Y_i \quad \text{Expression 2}$$

Here, i denotes luminances between the luminance of point C and the luminance of point A. Furthermore, X denotes the frequencies on the distribution line, and Y denotes the frequencies on the symmetry line from point C to point A obtained in step S703. That is to say, Expression 2 represents the accumulation of ratios of frequency differences to the frequencies corresponding to the luminances of the luminance distribution of the background generated in step S703.

In step S704, whether or not the degree of deviation calculated using Expression 2 is larger than a preset reference value. The processing moves to step S705 if the degree of deviation is larger than the preset reference value, and to step S707 if the degree of deviation is smaller than the preset reference value.

If the degree of deviation is larger than the preset reference value in step S704, it can be said that the luminance distributions of various light colors exist in the vicinity of the lower luminance side of the luminance distribution of the background of the printing medium. This is because it is considered that the distribution line has deviated from the symmetry line as a result of compositing such luminance distributions of light colors. Furthermore, it is considered that, due to the presence of such luminance distributions of various light colors, the peak value of the composite distribution obtained from the luminance distributions of light colors and the luminance distribution of the background has shifted toward the lower luminance side of the peak value of the luminance distribution of the background. Based on this idea, the luminance range between the luminance of point C and the luminance of point B is wider than the actual luminance range of the background, that is to say, the range from point E to point B, toward the lower luminance side. Therefore, in the present embodiment, if the calculated degree of deviation is large in step S704, it is determined that it is necessary to perform correction to shift the luminance of point C toward the higher luminance side in order to detect the actual luminance range of the background with high accuracy.

On the other hand, if the degree of deviation is smaller than the preset reference value in step S704, it can be said that the luminance distributions of other light colors do not exist in the vicinity of the lower luminance side of the luminance distribution of the background of the printing medium. Furthermore, as the luminance distributions of other light colors do not exist, it can be said that the peak value of the distribution line is equal to the peak value of the luminance distribution of the background. Based on this idea, the luminance range between the luminance of point C and the luminance of point B is equal to the actual luminance range of the background. Therefore, in the present embodiment, if the calculated degree of deviation is small in step S704, it is determined that the luminance of point C can be used as-is for the actual luminance range of the background.

In step S705, a luminance correction amount α for correcting the luminance of point C toward the higher luminance side is calculated. The luminance correction amount α is calculated using the following Expression 3.

$$\alpha = \text{maximum correction amount} \times (\text{degree of deviation} - \text{reference value})/(\text{maximum degree of deviation} - \text{reference value}) \quad \text{Expression 3}$$

Here, the maximum correction amount denotes the maximum value that the luminance correction amount α could take, for example, a luminance value of five, ten, and so on. The degree of deviation is a value calculated using Expression 2. The maximum degree of deviation is a value preset based on the degrees of deviation that were actually measured for a plurality of types of printing mediums, and is expressed as, for example, 60%. The maximum degree of deviation may be, for example, an average value of the degrees of deviation that were actually measured for the plurality of types of printing mediums. If the degree of deviation is larger than the maximum degree of deviation in the portion (degree of deviation−reference value)/(maximum degree of deviation−reference value) of Expression 3, the luminance correction amount α becomes larger than the maximum correction amount, thereby leading to overcorrection. Therefore, if the comparison between the calculated degree of deviation and the maximum degree of deviation shows that the degree of deviation is larger than the maximum degree of deviation, the degree of deviation may be considered to be equal to the maximum degree of deviation so as to prevent the luminance correction amount α from becoming larger than the maximum correction amount.

In step S706, the luminance correction amount α calculated using Expression 3 is added to the luminance of point C. Finally, in step S707, the background removal processing is executed based on the luminance of point C. The background removal processing in step S707 is the same as general background removal processing for removing the luminance distribution of luminances at or above a certain luminance value.

As described above, in the case where the background removal processing is executed, the present embodiment makes it possible to prevent unnecessary removal of the distribution of light colors that could serve as an information source. In the present embodiment, the luminance distribution of the background of the printing medium has been described as including the maximum luminance of the printed image. It should be noted that the same goes for the case where the luminance distribution of the background of the printing medium includes the minimum luminance of the printed image. One applicable example is the case where the background has a dark color. In this case, the luminance distribution shown in FIG. 8 applies, with the alteration that the axis representing luminance is labeled 0 to 255 from right to left. Furthermore, in this case, the description of the present embodiment applies with regard to the symmetry line, but the luminance range is corrected such that the luminance of point C is corrected to shift toward the lower luminance side by the calculated luminance correction amount α.

Second Embodiment

In the first embodiment, the degree of deviation of the distribution line from point D to point A from the symmetry line from point C to point A is obtained under the assumption that the frequency differences corresponding to the luminances in the relevant luminance range have the same degree of reliability. The present embodiment differs from the first embodiment in that the degrees of reliability of the frequency differences vary depending on the luminances.

Figure 9:
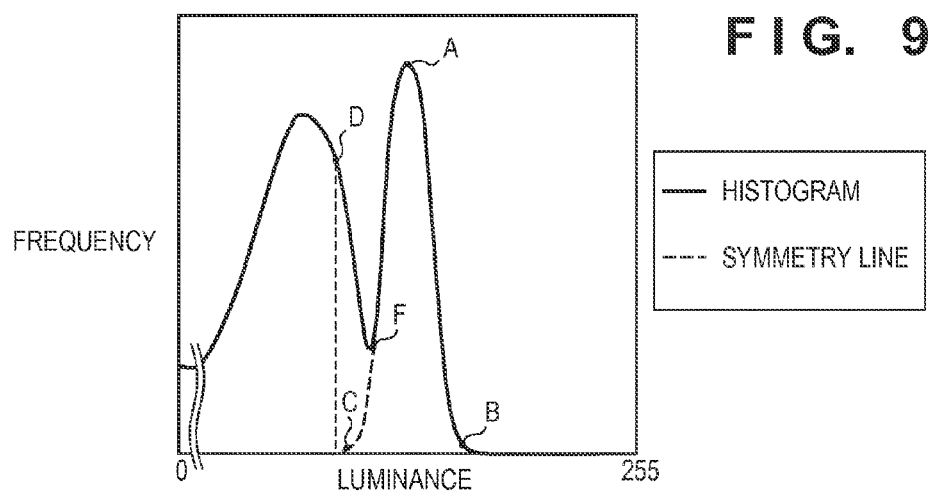
FIG. 9 shows another distribution line obtained from a luminance histogram.
Figure 10:
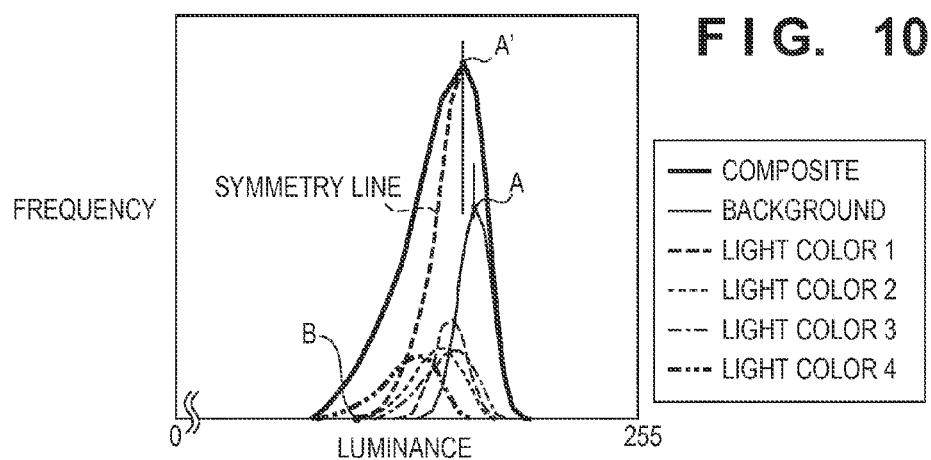
FIG. 10 shows the shift between the luminance distribution of a background and a composite distribution.

For example, the integrated value of the frequency differences between the symmetry line from point C to point A and the distribution line from point D to point A is the same in FIGS. 8 and 9. However, while FIG. 8 shows frequency differences in the vicinity of peak point A, FIG. 9 shows no frequency difference from point F to point A and shows frequency differences from point C to point F. That is to say, in the case of FIG. 9 that shows frequency differences only in the vicinity of point C, it is considered that the luminance distributions of light colors have a small influence on the peak point of the luminance distribution of the background. Therefore, in the present embodiment, it is considered that, between point C and peak point A, the degree of reliability of the frequency difference increases toward the peak point A.

In the present embodiment, the degree of deviation is calculated using the following Expression 4.

$$\text{Degree of deviation} = \sum_{i=1}^{n} (a_i^* |X_i - Y_i|) \Big/ \sum_{i=1}^{n} Y_i \qquad \text{Expression 4}$$

Here, i denotes luminances between the luminance of point C and the luminance of point A. Furthermore, X denotes the frequencies on the distribution line, and Y denotes the frequencies on the symmetry line from point C to point A obtained in step S703. In addition, a denotes the weight (degree of reliability) corresponding to each luminance, and the value of a increases as the luminance increases in the luminance range between point C to point A.

In the present embodiment, it is considered that, in the vicinity of peak point A, the influence on the luminance correction amount α is large even if the deviation of the distribution line from the symmetry line is minute. On the other hand, it is considered that, in the vicinity of point C, the influence on the luminance correction amount α is small even if the deviation of the distribution line from the symmetry line is significant. As a result, the luminance correction amount α can be calculated more correctly.

In the first and second embodiments, the degree of deviation from the symmetry line connecting point C, point A and point B is calculated based on the integrated value of the frequency differences from point C to point A. However, alternatively, it is possible to calculate the frequency difference between the distribution line and the symmetry line only at point C as the degree of deviation. Point C corrected by the luminance correction amount α can be used for purposes other than the background removal. For example, in separating image regions in the image, corrected point C may be used to determine the background and regions other than the background. Alternatively, in transmitting and receiving the image using a black-and-white facsimile machine, corrected point C may be used as a threshold for binarization.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-004050, filed Jan. 11, 2013, which is hereby incorporated by reference herein in its entirety.

What is claimed is:

1. An image processing apparatus comprising:
    an image data acquisition unit configured to acquire image data by optically reading a document;
    a frequency distribution acquisition unit configured to acquire a first frequency distribution of luminances from the image data acquired by the image data acquisition unit;
    a generation unit configured to generate a second frequency distribution of luminances of a background of the document, by using a maximum frequency of the first frequency distribution acquired by the frequency distribution acquisition unit as a maximum frequency of the second frequency distribution of luminances of the background of the document;
    an acquisition unit configured to acquire information indicating a degree of deviation of the second frequency distribution from the first frequency distribution;
    a correction unit configured to correct the second frequency distribution based on the information indicating the degree of deviation acquired by the acquisition unit; and
    an image processing unit configured to process the image data using the corrected second frequency distribution.

2. The image processing apparatus according to claim 1, wherein the correction unit performs the correction by moving a minimum luminance point on the second frequency distribution toward a higher luminance side.

3. The image processing apparatus according to claim 1, wherein, in a case when the degree of deviation indicated by the information acquired by the acquisition unit is larger, a degree of correction by the correction unit is larger.

4. The image processing apparatus according to claim 1, wherein the second frequency distribution includes a maximum luminance of the first frequency distribution acquired by the frequency distribution acquisition unit.

5. The image processing apparatus according to claim 1, wherein the generation unit generates the second frequency distribution, based on a luminance corresponding to the maximum frequency of the first frequency distribution acquired by the frequency distribution acquisition unit and a maximum luminance of the first frequency distribution acquired by the frequency distribution acquisition unit.

6. The image processing apparatus according to claim 5, wherein the second frequency distribution generated by the generation unit is symmetrical with respect to the luminance corresponding to the maximum frequency, toward a lower luminance side and a higher luminance side.

7. The image processing apparatus according to claim 1, wherein the acquisition unit calculates the degree of deviation by accumulating a frequency difference for each luminance, and, in the accumulation, a weight for the frequency difference increases toward a luminance corresponding to the maximum frequency of the first frequency distribution acquired by the frequency distribution acquisition unit.

8. The image processing apparatus according to claim 1, wherein the acquisition unit acquires the information indicating the degree of deviation based on a frequency difference for each luminance between the first frequency distribution and the second frequency distribution.

9. The image processing apparatus according to claim 8, wherein the acquisition unit acquires the information indicating the degree of deviation by accumulating the frequency difference for each luminance between the first frequency distribution and the second frequency distribution.

10. The image processing apparatus according to claim 9, wherein the acquisition unit acquires the information indicating the degree of deviation by accumulating the frequency difference for each luminance between the first frequency distribution and the second frequency distribution corresponding to a higher luminance than a minimum luminance of the second frequency distribution.

11. The image processing apparatus according to claim 9, wherein the acquisition unit executes the accumulation according to a weight for the frequency difference, and the weight increases toward a luminance corresponding to the maximum frequency of the first frequency distribution.

12. The image processing apparatus according to claim 1, further comprising a printing unit configured to perform printing using the image data on which a process using the corrected second frequency distribution is performed.

13. A luminance correction method executed by an image processing apparatus, the method comprising:
    an image data acquisition step of acquiring image data by optically reading a document;
    a frequency distribution acquisition step of acquiring a first frequency distribution of luminances from the image data acquired in the image data acquisition step;
    a generation step of generating a second frequency distribution of luminances of a background of the document using a maximum frequency of the first frequency distribution acquired in the frequency distribution acquisition step as a maximum frequency of the second frequency distribution of luminances of the background of the document;
    an acquisition step of acquiring information indicating a degree of deviation of the second frequency distribution from the first frequency distribution;
    a correction step of correcting the second frequency distribution based on the information indicating the degree of deviation acquired in the acquisition step; and
    an image processing step of processing the image data using the corrected second frequency distribution generated in the generation step.

14. The method according to claim 13, wherein the acquisition step acquires the information indicating the degree of deviation based on a frequency difference for each luminance between the first frequency distribution and the second frequency distribution.

15. The method according to claim 14, wherein the acquisition unit acquires the information indicating the degree of deviation by accumulating the frequency difference for each luminance between the first frequency distribution and the second frequency distribution.

16. The method according to claim 15, wherein the acquisition unit acquires the information indicating the degree of deviation by accumulating the frequency difference for each luminance between the first frequency distribution and the second frequency distribution corresponding to a higher luminance than a minimum luminance of the second frequency distribution.

17. The method according to claim 15, wherein the acquisition unit executes the accumulation according to a weight for the frequency difference, and the weight increases toward a luminance corresponding to the maximum frequency of the first frequency distribution.

18. The method according to claim 13, further comprising a printing unit configured to perform printing using the image data on which a process using the corrected second frequency distribution is performed.

19. A non-transitory computer-readable storage medium storing a program for causing a computer to execute:
   an image data acquisition step of acquiring image data by optically reading a document;
   a frequency distribution acquisition step of acquiring a first frequency distribution of luminances from the image data acquired in the image data acquisition step;
   a generation step of generating a second frequency distribution of luminances of a background of the document using a maximum frequency of the first frequency distribution acquired in the frequency distribution acquisition step as a maximum frequency of the second frequency distribution of luminances of the background of the document;
   an acquisition step of acquiring information indicating a degree of deviation of the second frequency distribution from the first frequency distribution;
   a correction step of correcting the second frequency distribution based on the information indicating the degree of deviation acquired in the acquisition step; and
   an image processing step of processing the image data using the corrected second frequency distribution generated in the generation step.

20. The medium according to claim 19, wherein the acquisition unit acquires the information indicating the degree of deviation based on a frequency difference for each luminance between the first frequency distribution and the second frequency distribution.

21. The medium according to claim 20, wherein the acquisition unit acquires the information indicating the degree of deviation by accumulating the frequency difference for each luminance between the first frequency distribution and the second frequency distribution.

22. The medium according to claim 21, wherein the acquisition unit acquires the information indicating the degree of deviation by accumulating the frequency difference for each luminance between the first frequency distribution and the second frequency distribution corresponding to a higher luminance than a minimum luminance of the second frequency distribution.

23. The medium according to claim 21, wherein the acquisition unit executes the accumulation according to a weight for the frequency difference, and the weight increases toward a luminance corresponding to the maximum frequency of the first frequency distribution.

24. The medium according to claim 19, further comprising a printing unit configured to perform printing using the image data on which a process using the corrected second frequency distribution is performed.

* * * * *